United States Patent [19]
Gillooly

[11] Patent Number: 5,467,967
[45] Date of Patent: Nov. 21, 1995

[54] WATER TEMPERATURE CONTROL DEVICE

[76] Inventor: Gregory T. Gillooly, 6895 Arbor La., Bryans Road, Md. 20616

[21] Appl. No.: 374,210

[22] Filed: Jan. 18, 1995

[51] Int. Cl.⁶ ..................................................... F16K 5/00
[52] U.S. Cl. ............................................ 251/288; 251/285
[58] Field of Search ................................. 251/285, 286, 251/288

[56] References Cited

U.S. PATENT DOCUMENTS

| | | |
|---|---|---|
| 1,430,505 | 9/1922 | Hinchman ........................... 251/285 X |
| 1,689,236 | 10/1928 | Fraser, Jr. . |
| 2,708,551 | 5/1955 | Record . |
| 3,348,577 | 10/1967 | Miller et al. . |
| 3,635,252 | 1/1972 | Botnick . |
| 4,220,175 | 9/1980 | Keller, III et al. . |
| 5,318,070 | 6/1994 | Surabian . |

FOREIGN PATENT DOCUMENTS

| | | |
|---|---|---|
| 1941107 | 2/1971 | Germany . |
| 1775579 | 8/1971 | Germany . |
| 2035280 | 1/1972 | Germany . |
| 2337614 | 2/1974 | Germany . |
| 3211618A1 | 10/1983 | Germany . |
| 92461 | 5/1959 | Netherlands ........................... 251/285 |

*Primary Examiner*—John C. Fox
*Attorney, Agent, or Firm*—Richard C. Litman

[57] ABSTRACT

The present invention is a faucet which can be opened to a user settable degree, thus allowing a user to set the water temperature. The faucet knob has an internal cavity which houses a left-hand threaded sleeve. As the faucet knob is turned counter-clockwise, a threaded stop collar, which matingly engages the threaded sleeve, is drawn up within the faucet knob cavity until the collar encounters a setscrew. The setscrew prevents further movement of the stop collar along the threaded sleeve, thus preventing further turning of the knob. The surface, of the stop collar, which contacts the setscrew can be provided with resilient ramps which allow further adjustment of the knob position by an adult user, and raised flats or steps which completely prevent any further turning of the knob once the stop collar reaches the setscrew. More than one setscrew can be provided to accommodate the water temperature preferences of different users.

13 Claims, 3 Drawing Sheets

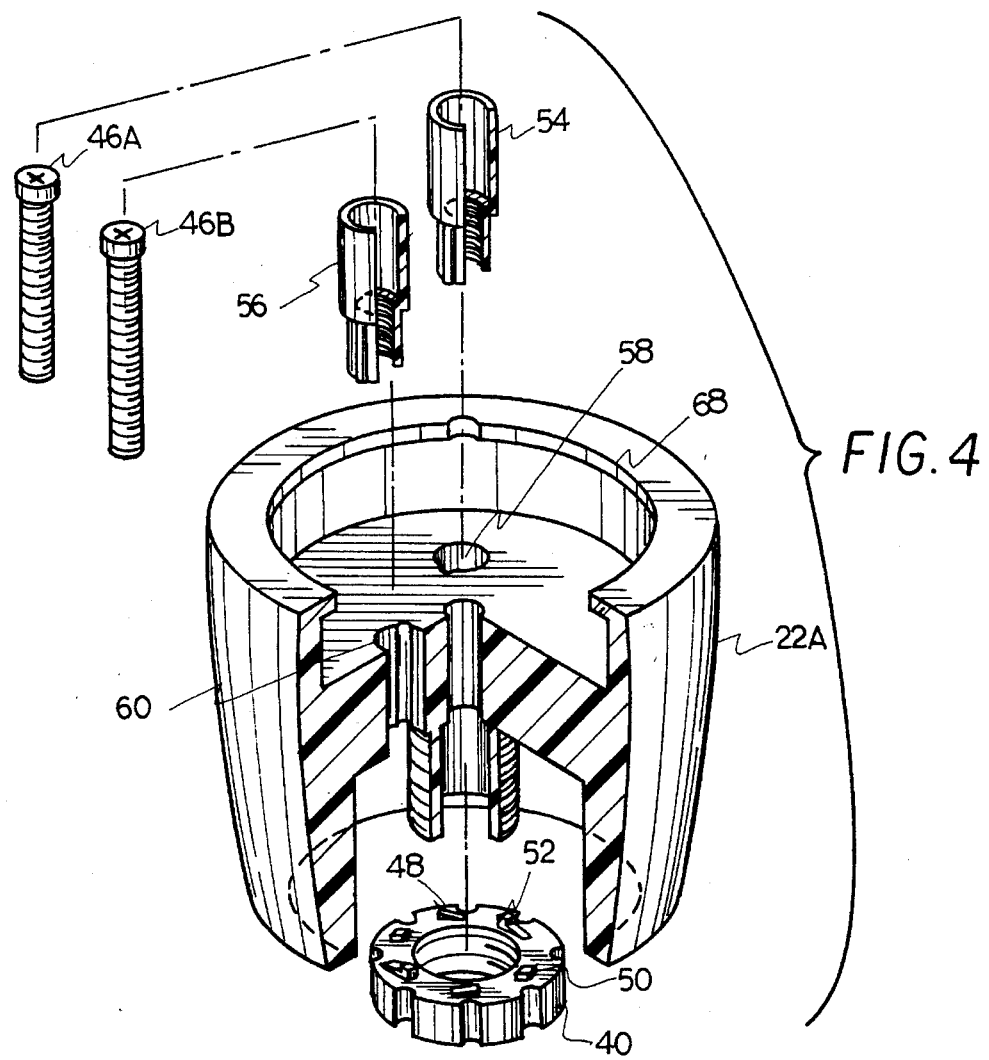
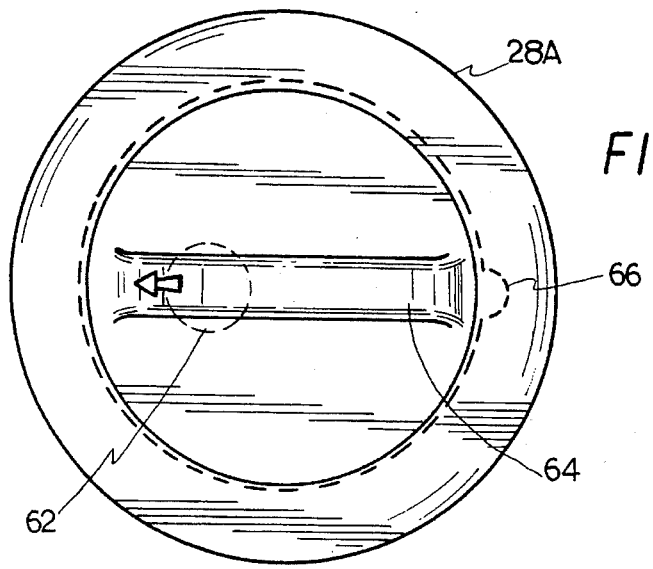
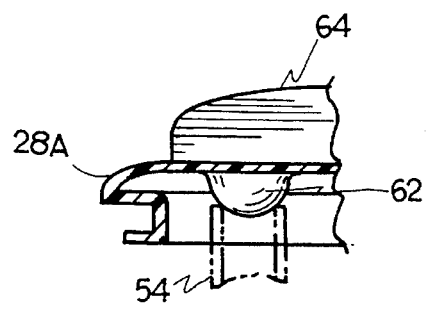

5,467,967

WATER TEMPERATURE CONTROL DEVICE

BACKGROUND OF THE INVENTION

1. Field of the Invention

The present invention relates to a knob for a faucet which limits the opening of the valve for the faucet to a user selected amount.

2. Description of the Prior Art

It is a common practice, when taking a shower for example, to set the water temperature by trial-and-error. Both hot and cold faucets are usually opened and the users hand is held in the running water stream to "feel" the temperature of the water. Then, depending on whether the water feels cold or hot, the positions of the knobs for the hot and cold water are adjusted. The water temperature is then felt again, and the process is repeated until the felt temperature of the water reaches the desired level.

Ordinarily, when the hot water faucet is closed the water remaining in the pipes cools down relative to the water in the water heater tank. When the faucet is turned on, it takes several minutes for the cooler water to be flushed out of the pipes and for the hot water from the water heater tank to reach the faucet. If the water temperature was adjusted prior to allowing the cooler water to be flushed from the piping system, the water temperature will suddenly change and the person taking a shower may be scalded when hot water from the water heater tank reaches the faucet.

In addition, when children are being bathed in the tub, they may unexpectedly reach for the hot water faucet and unknowingly open the hot water faucet to its most open position, thus scalding themselves or the adult bathing them.

For these reasons, many systems have been proposed in the prior art for regulating the temperature of the water issuing from domestic bathroom and kitchen faucets.

U.S. Pat. No. 5,318,070, issued to Surabian, shows a faucet where electric motors open and close the hot and cold water valves through respective gear trains which operate to turn the valve stems. The Surabian system does not have any provision for limiting valve opening to a preset level. Turning the electric motors on and off merely duplicates the function of the standard faucet handles or knobs. The Surabian system was intended mainly to allow the elderly or the handicapped, who either lack the strength or the means for operating standard faucet handles or knobs, to turn on the faucet.

U.S. Pat. No. 4,220,175, issued to Keller, III et al., shows an anti-scald bathroom faucet. The Keller, III et al., faucet has an adjustable stop on the faucet cover plate. The stop is engaged by an abutment on the faucet knob to restrict faucet opening to a preselected level. The Keller, III et al., system is suitable for use with mixing faucets only, and cannot be retrofitted to existing valves. Further, the Keller, III et al., system lacks the left-hand threaded sleeve and stop collar of the present invention.

U.S. Pat. No. 3,635,252, issued to Botnick, shows a sliding plate mixing valve wherein slotted cylindrical plugs control water temperature by restricting the hot and cold water flow passage areas to preselected amounts. The Botnick system is suitable for use with mixing faucets only, and cannot be retrofitted to existing valves. Further, the Botnick system lacks the left-hand threaded sleeve and stop collar of the present invention.

U.S. Pat. No. 3,348,577, issued to Miller et al., shows a push button mixing faucet for a kitchen or bathroom. The Miller et al. faucet has a two piece push button for warm water. The positions of the two pieces of the warm water button, relative to each other, determines the relative openings of the hot and cold water valves thereby controlling the warm water temperature. The Miller et al. system is suitable for use with mixing faucets only, and cannot be retrofitted to existing valves. Further, the Miller et al. system lacks the left-hand threaded sleeve and stop collar of the present invention.

U.S. Pat. No. 2,708,551, issued to Record, shows a temperature regulator for a faucet. The Record device has a rectangular mixing chamber. A bellows type thermostat controls the relative openings of the hot and cold water inlets to the mixing chamber, thus controlling the water temperature. The Record device is suitable for use with mixing faucets only, and cannot be retrofitted to existing valves. Further, the Record device lacks the left-hand threaded sleeve and stop collar of the present invention.

U.S. Pat. No. 1,689,236, issued to Fraser, Jr., shows an adjustable stop on a valve knob, which engages a post adjacent the valve to limit the opening of the valve to a user selected amount. The Fraser, Jr. device lacks the left-hand threaded sleeve and stop collar of the present invention.

German Patent Document Number 3211618 A1, by Woitelle et al., shows a mixing valve faucet actuated by a lever. The Woitelle et al. device lacks a left-hand threaded sleeve and mating stop collar.

German Patent Document Number 2 337 614, by Kempler, shows a conventional mixing faucet with separate hot and cold water valve opening levers.

German Patent Document Number 2 035 280, by Gruber, shows a water faucet with separate temperature and flow controls. The Gruber faucet uses a thermostat to control water temperature.

German Patent Document Number 1 941 107, by Diem, shows a push-button bathroom faucet with a handheld shower attachment.

German Patent Document Number 1 775 579, by Gohring, shows a conventional bathroom faucet having a decorative housing which is held in place by eccentric collars which fit around the hot and cold water pipes.

None of the above inventions and patents, taken either singly or in combination, is seen to describe the instant invention as claimed.

SUMMARY OF THE INVENTION

The present invention is a faucet which can be opened to a user settable degree. Using the faucet of the present invention on both the hot and cold water pipes allows the user to set the water temperature. The faucet knob has an internal cavity which houses a left-hand threaded sleeve. As the faucet knob is turned counter-clockwise, a threaded stop collar, which matingly engages the threaded sleeve, is drawn up within the faucet knob cavity. A setscrew is provided in the top portion of the faucet knob. The setscrew passes through the top of the faucet knob and protrudes into the internal cavity. Once the stop collar reaches the setscrew, the setscrew prevents further movement of the stop collar along the threaded sleeve, thus preventing further turning of the knob. The amount of protrusion of the setscrew into the internal cavity can be set by a user, thus allowing the user to control how far the knob can be turned.

Further, the surface of the stop collar which contacts the setscrew can be provided with resilient ramps which allow further adjustment of the knob position by an adult user, and raised flats or steps which completely prevent any further turning of the knob once the stop collar reaches the setscrew.

In addition, more than one setscrew can be provided to accommodate the water temperature preferences of different users. In the case of multiple setscrews, the setscrews are housed in sliding inserts which can selectively be brought into an operating position.

Accordingly, it is a principal object of the invention to provide a faucet which allows the user to set the maximum amount for the opening of the valve.

It is another object of the invention to provide a faucet which allows for a plurality of maximum opening settings corresponding to the preferences of a plurality of users.

It is a further object of the invention to allow adult users some flexibility in adjusting the maximum valve opening, without the necessity of readjusting the setscrew, while preventing a child from exceeding the maximum valve opening set by an adult.

Still another object of the invention is to provide an anti-scalding faucet which can be retrofitted to existing, standard faucet valves.

Still another object of the invention is to provide an anti-scalding faucet which can be fitted to valve stems of various shapes without any modification.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is an exploded perspective view of the knob assembly of the second embodiment of the present invention, partially broken away to show internal detail.

FIG. 5 is a top view of the knob cap of the second embodiment of the present invention.

FIG. 6 is a partial view of the second embodiment of the present invention showing the relationship between the bulge on the underside of the knob cap and the sliding insert.

Similar reference characters denote corresponding features consistently throughout the attached drawings.

DETAILED DESCRIPTION OF THE PREFERRED EMBODIMENTS

Figure 1:
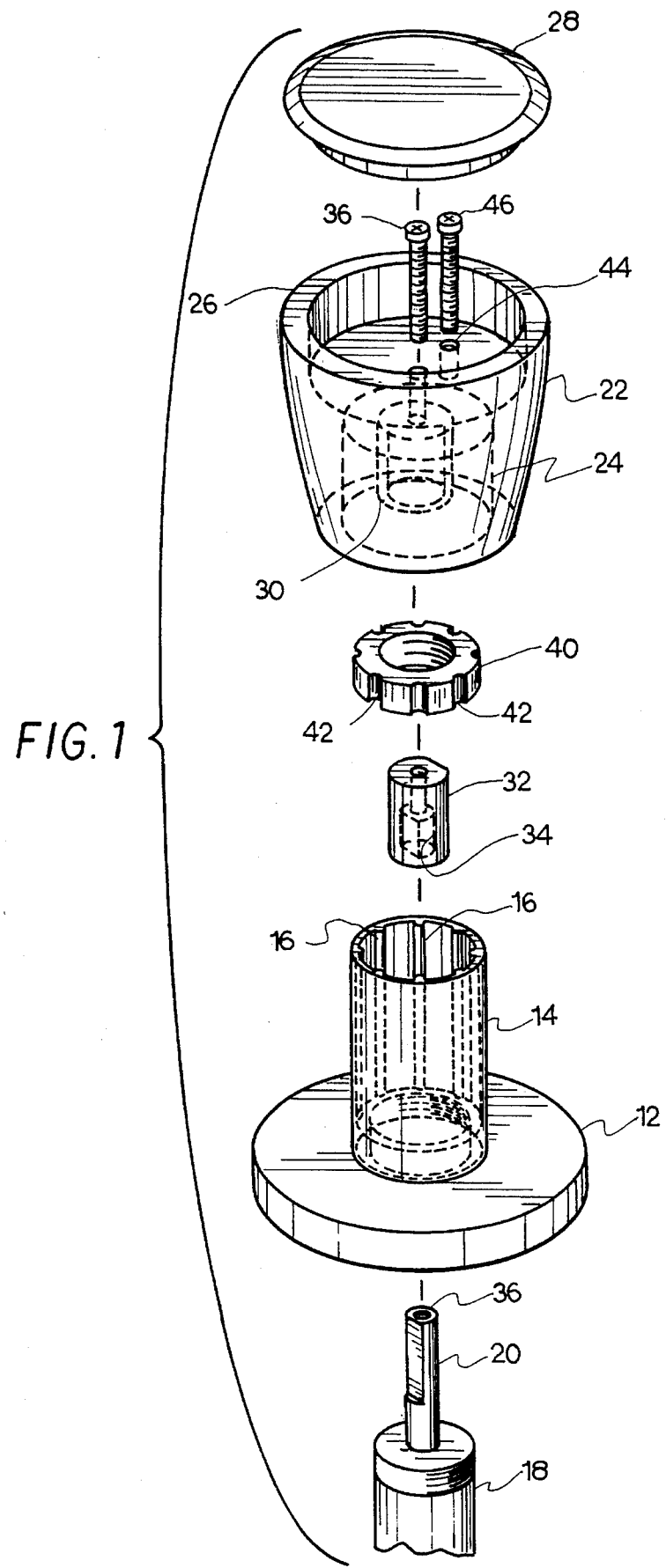
FIG. 1 is an exploded view of the first embodiment of the present invention.
Figure 2:
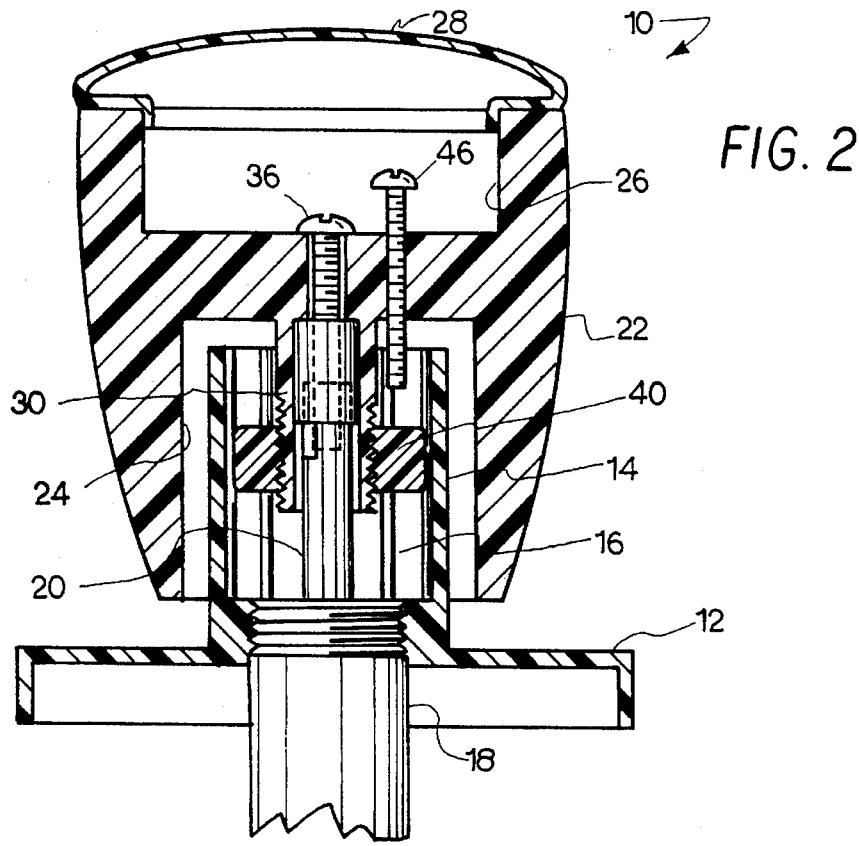
FIG. 2 is a side elevational view in cross section of the first embodiment of the present invention.
Figure 3:
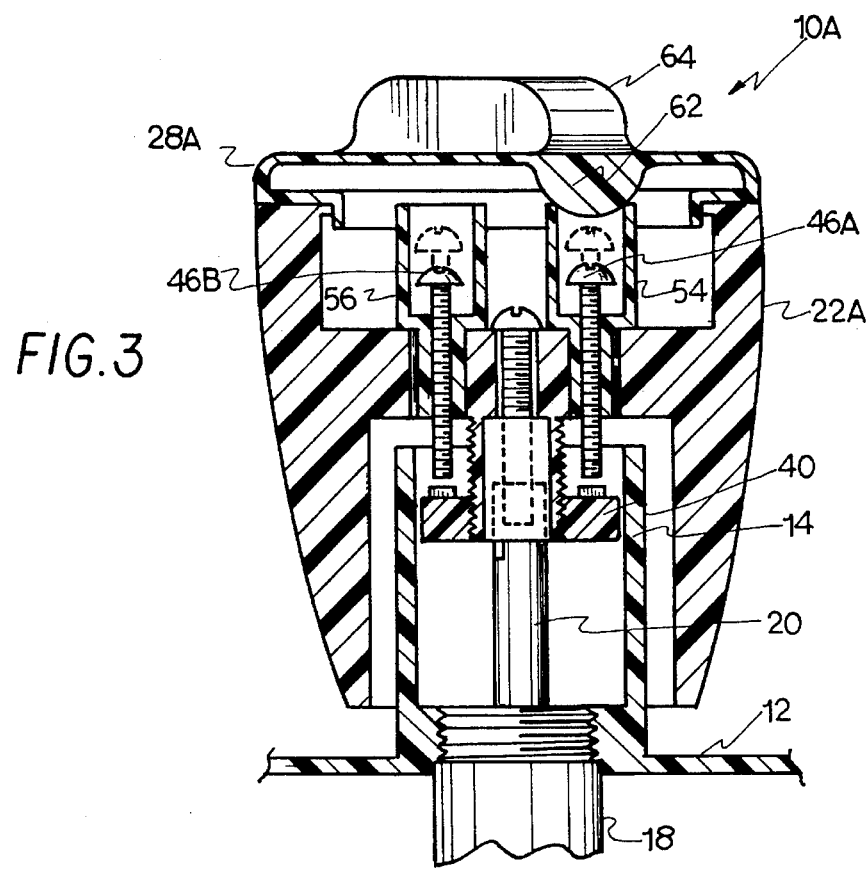
FIG. 3 is a partially broken away side elevational view of the second embodiment of the present invention.

Referring to FIGS. 1 and 2, the first embodiment of the present invention relates to a faucet 10 which allows a user to set the maximum amount to which the faucet can be opened. The faucet 10 includes a face plate 12 which gives an aesthetically pleasing appearance to the area of the bathroom wall, sink, or bathtub through which the water valve 18 penetrates. The face plate 12 has a sleeve portion 14 which extends in a direction normal to the base of the face plate 12, and surrounds the valve stem 20 when the face plate 12 is positioned over the valve 18. The sleeve portion 14 has a plurality of ribs 16 provided on the interior surface thereof.

The faucet 10 further includes a knob 22 which has a top cavity 26 and a bottom cavity 24. Housed in the bottom cavity 24 is a threaded sleeve 30. The threaded sleeve 30 has a hollow interior designed to receive a key insert 32. The key insert 32 has a key hole 34 which matingly fits on the top portion of the valve stem 20. The cross section of the top portion of the valve stem 20 can be any shape as long as it is non-circular. The key hole 34 must be shaped to mate with the top portion of the valve stem 20. In the example shown in the figures, a flat at the top portion of the valve stem 20 mates with a flat provided in the key hole 34 in order to prevent relative rotation between the key insert 32 and the valve stem 20.

The key insert 32 can be press fit into the hollow interior of the threaded sleeve 30 in order to prevent relative rotation between the knob 22 and the key insert 32. Alternatively, a flat can be provided on the exterior of the key insert 32 which mates with a corresponding flat provided within the hollow interior of the threaded sleeve 30 in order to prevent relative rotation between the knob 22 and the key insert 32. Simply changing key inserts allows the faucet of the present invention to be fitted to valves having valve stems of varying shapes from different manufacturers.

A fastener 36, in this example a Phillips head screw, passes through a hole in the center of the knob 22, through the key insert 32, and matingly engages a threaded hole 38 in the top portion of the valve stem 20. With the screw 36 tightened in the threaded hole 38, rotation of the knob 22 will cause rotation of the valve stem 20. As is conventional in the art counter-clockwise rotation of the knob 22 opens the valve 18.

A stop collar 40 is matingly engaged to the threaded sleeve 30. The stop collar 40 has a plurality of grooves 42 provided about the periphery thereof. When the faucet 10 is fully assembled, the grooves 42 slidably engage the ribs 16 on the inside surface of the sleeve portion 14. The ribs 16 function to prevent the rotation of the stop collar 40 about the longitudinal axis of the sleeve portion 14. The threaded sleeve 30 has left-handed threads on its surface. Therefore, when the knob 22 is turned counter-clockwise to open the faucet 10, because the stop collar 40 is not free to rotate, the stop collar 40 is drawn up along the threaded sleeve 30.

A threaded hole 44 is provided above the annular gap between the threaded sleeve 30 and the inside surface of the sleeve portion 14. A setscrew 46 matingly engages the hole 44. By turning the setscrew 46 a user can adjust the length of the portion of the set screw which penetrates into the cavity 24. As was mentioned previously, turning knob 22 counter-clockwise to open faucet 10, causes the stop collar 40 to be drawn up toward the set screw 46. When the stop collar 40 contacts the set screw 46, further counter-clockwise movement of the knob 22 is prevented. Therefore, by adjusting the length of the portion of the setscrew 46 which penetrates in the cavity 24 a user can set the limit to which the faucet 10 can be opened.

A decorative cap 28 acts as a closure for the top cavity 26, and provides an aesthetically pleasing appearance to the faucet 10. Any suitable method for securing the cap 28 to the knob 22 can be used. In the present example the two are frictionally fit together.

As shown in FIG. 4, the stop collar 40 can optionally be provided with three dimensional structures on its surface which contacts the setscrew 46. The structures on the contact surface of the stop collar 40 can be shaped like ramps 48, raised steps 50, or ramps terminating in raised steps 52. For an adult user, the stop collar 40 is positioned, during assembly, in such a way that a ramp 48, or a ramp and step combination 52, registers with the set screw 46 when the knob 22 is turned to its user set limit. The material of the stop collar 40 is resilient enough to allow the ramp to be slightly compressed, thus allowing the adult user to turn the knob 22 slightly past its preset limit. This gives the adult user the option of some adjustment to the water temperature to suit conditions and preferences at the particular time.

For a child user, the stop collar 40 is positioned, during assembly, in such a way that the setscrew 46 contacts the stop collar 40 just ahead of a raised step 50. In this manner there is no possible way for the child to open the faucet 10 passed its set point.

Referring to FIGS. 3 to 6, the second embodiment of the present invention is shown. Ribs 16 have been omitted from FIG. 3 in the interest of clarity of the view. The faucet 10a is identical in structure and operation to faucet 10 except as otherwise enumerated below.

The knob 22a has provision for two setscrews instead of just one, thus allowing the faucet opening limit to be set for the preferences of two different individuals, or allowing one setting for an adult and one setting for a child.

Instead of the one threaded hole 44, knob 22a has two holes 58 and 60. The holes 58 and 60 are smooth except for guide grooves which extend longitudinally along the inside surface of holes 58 and 60. Two sliding inserts 54 and 56 fit inside respective holes 58 and 60. The sliding inserts 54 and 56 have an upper portion and a lower portion. The lower portions of the sliding inserts 54 and 56 are threaded and matingly engage respective setscrews 46a and 46b. The lower portions of the sliding inserts 54 and 56 also have guide ribs provided on their exterior surfaces which fit inside the guide grooves on the inside surfaces of holes 58 and 60. The grooves and ribs prevent rotation of the sliding inserts when the setscrews are turned.

The upper portions of the sliding inserts 54 and 56 house the heads of respective set screws 46a and 46b. The lengths of the upper portions of the sliding inserts 54 and 56 are sufficient to accommodate the setscrew heads over their entire adjustment range. The cap 28a has a bulge 62, which can be positioned above either the insert 54 or the insert 56 to keep the particular insert from sliding within its respective hole. Thus whichever insert, and corresponding setscrew, that has the bulge positioned above it, will act to set the limit to which the knob 22a can be turned. The other sliding insert and set screw assembly will freely slide within its respective hole 58 or 60, and thus will not impede the movement of the stop collar 40.

The cap 28a has a grasping ridge 64 to allow a user to selectively position the bulge 62 over either the sliding insert 54 or the sliding insert 56. The cap 28a can be secured to knob 22a in any convenient manner which allows rotational movement of the cap 28a. In the specific example shown a tab 66 extending from cap 28a fits under the rim 68 to secure cap 28a to the knob 22a while still allowing rotational movement of the cap 28a.

It is to be understood that the present invention is not limited to the sole embodiment described above, but encompasses any and all embodiments within the scope of the following claims.

I claim:

1. A faucet wherein the maximum amount to which the faucet can be opened is settable by a user, comprising:

a face plate having a sleeve portion, said sleeve portion having first and second open ends, a longitudinal axis, and a hollow interior, said face plate being capable of fitting over a valve having a valve stem so as to allow the valve stem to pass through said first open end and be housed substantially within said hollow interior of said sleeve portion;

a knob having a top portion and a bottom portion, said bottom portion having a cavity receiving a portion of said sleeve portion proximate said second open end, said knob further having a threaded sleeve provided within said cavity, said threaded sleeve passing through said second open end and being positioned within said sleeve portion;

a fastener passing substantially centrally through said knob and engageable with the valve stem;

a setscrew having a longitudinal axis and passing through said knob so as to penetrate into said cavity and have a portion thereof be positioned within said cavity, said longitudinal axis of said setscrew passing between said threaded sleeve and said sleeve portion; and a stop collar matingly engaging said threaded sleeve, whereby turning said knob causes said stop collar to move along said threaded sleeve and said knob is substantially prevented from turning once said stop collar contacts said setscrew.

2. The faucet according to claim 1, wherein said hollow interior of said sleeve portion has a surface, said sleeve portion has a plurality of ribs provided on said surface of said hollow interior of said sleeve portion, said plurality of ribs being arranged circumferentially about said longitudinal axis of said sleeve portion and being substantially parallel to said longitudinal axis of said sleeve portion, and wherein said stop collar has a plurality of grooves, corresponding in number to said plurality of ribs, evenly distributed about its periphery, said plurality of grooves engaging said plurality of ribs, whereby said stop collar is prevented from rotating about said longitudinal axis of said sleeve portion.

3. The faucet according to claim 2, wherein said stop collar has a contact surface, said contact surface having a plurality of structures formed thereon, said structures having shapes selected from the group consisting of ramps, raised steps and combinations thereof.

4. The faucet according to claim 3, wherein said threaded sleeve has a hollow interior housing a key insert, said key insert having a key hole, and said key hole being matingly engageable with the valve stem, whereby rotation of said knob causes rotation of the valve stem.

5. A faucet wherein the maximum amount to which the faucet can be opened is settable by a user, comprising:

a face plate having a sleeve portion, said sleeve portion having first and second open ends, a longitudinal axis, and a hollow interior, said face plate being capable of fitting over a valve having a valve stem so as to allow the valve stem to pass through said first open end and be housed substantially within said hollow interior of said sleeve portion;

a knob having a top portion and a bottom portion, said bottom portion having a cavity receiving a portion of said sleeve portion proximate said second open end, said knob further having a threaded sleeve provided within said cavity, said threaded sleeve passing through said second open end and being positioned within said sleeve portion;

a fastener passing substantially centrally through said knob and engageable with the valve stem;

first and second setscrews each having a longitudinal axis and each passing through said knob so as to penetrate into said cavity and so as to have a portion thereof be positioned within said cavity, said longitudinal axes of said first and second setscrews passing between said threaded sleeve and said sleeve portion; and a stop collar matingly engaging said threaded sleeve, whereby turning said knob causes said stop collar to move along said threaded sleeve and said knob is substantially prevented from turning once said stop collar contacts one of said first and second setscrews.

6. The faucet according to claim 5, wherein said knob has first and second through holes positioned above an annular space defined by said sleeve portion and said threaded sleeve, said first and second through holes allowing access to said cavity, each of said first and second setscrews threadably engages a respective one of first and second sliding inserts, and said first and second sliding inserts slidably engage a respective one of said first and second through holes, whereby when one of said first and second sliding inserts is held in place while the other one of said first and second sliding inserts is allowed to slide freely along a respective one of said first and second through holes, one of said first and second setscrews threadably engaging the one of said first and second sliding inserts being held in place acts to substantially prevent said knob from turning.

7. The faucet according to claim 6, wherein said first and second slidable inserts are selectively held in position by a bulge provided on the underside of a cap rotatably secured to said knob.

8. The faucet according to claim 7, wherein said hollow interior of said sleeve portion has a surface, said sleeve portion has a plurality of ribs provided on said surface of said hollow interior of said sleeve portion, said plurality of ribs being arranged circumferentially about said longitudinal axis of said sleeve portion and being substantially parallel to said longitudinal axis of said sleeve portion, and wherein said stop collar has a plurality of grooves, corresponding in number to said plurality of ribs, evenly distributed about its periphery, said plurality of grooves engaging said plurality of ribs, whereby said stop collar is prevented from rotating about said longitudinal axis of said sleeve portion.

9. The faucet according to claim 8, wherein said stop collar has a contact surface, said contact surface having a plurality of structures formed thereon, said structures having shapes selected from the group consisting of ramps, raised steps and combinations thereof.

10. The faucet according to claim 9, wherein said threaded sleeve has a hollow interior housing a key insert, said key insert having a key hole, and said key hole being matingly engageable with the valve stem, whereby rotation of said knob causes rotation of the valve stem.

11. The faucet according to claim 5, wherein said hollow interior of said sleeve portion has a surface, said sleeve portion has a plurality of ribs provided on said surface of said hollow interior of said sleeve portion, said plurality of ribs being arranged circumferentially about said longitudinal axis of said sleeve portion and being substantially parallel to said longitudinal axis of said sleeve portion, and wherein said stop collar has a plurality of grooves, corresponding in number to said plurality of ribs, evenly distributed about its periphery, said plurality of grooves engaging said plurality of ribs, whereby said stop collar is prevented from rotating about said longitudinal axis of said sleeve portion.

12. The faucet according to claim 11, wherein said stop collar has a contact surface, said contact surface having a plurality of structures formed thereon, said structures having shapes selected from the group consisting of ramps, raised steps and combinations thereof.

13. The faucet according to claim 12, wherein said threaded sleeve has a hollow interior housing a key insert, said key insert having a key hole, and said key hole being matingly engageable with the valve stem, whereby rotation of said knob causes rotation of the valve stem.

* * * * *